United States Patent [19]

Rojey et al.

[11] 4,341,084
[45] Jul. 27, 1982

[54] COLD AND/OR HEAT PRODUCTION INVOLVING AN ABSORPTION CYCLE AND ITS USE FOR HEATING BUILDINGS

[75] Inventors: Alexandre Rojey, Garches; Georges Cohen, Le Pecq, both of France

[73] Assignee: Institut Francais du Petrole, Rueil-Malmaison, France

[21] Appl. No.: 234,214

[22] Filed: Feb. 13, 1981

[30] Foreign Application Priority Data

Feb. 15, 1980 [FR] France .................. 80 03460

[51] Int. Cl.³ .................................. F25B 15/00
[52] U.S. Cl. ........................ 62/101; 62/114; 62/238.3; 62/324.2
[58] Field of Search .............. 62/101, 324.2, 238.3, 62/114

[56] References Cited

U.S. PATENT DOCUMENTS 2,182,098 12/1939 Sellew .................. 62/324.2
2,182,453 12/1939 Sellew .................. 62/238.3
3,817,050 6/1974 Alexander et al. ........ 62/101
4,102,388 7/1978 Blytas ................ 62/101 X
4,167,101 9/1979 Rojey .................. 62/102

FOREIGN PATENT DOCUMENTS 2321098 12/1977 France .................. 62/101

*Primary Examiner*—Lloyd L. King
*Attorney, Agent, or Firm*—Millen & White

[57] ABSTRACT

Cold or heat are produced by an absorption process comprising an absorption step, a desorption step, a rectification step, a condensation step and a vaporization step. The process operates at a lower pressure level and at a higher performance rate than the conventional absorption processes. This result is obtained by condensing the vapor phase from the rectification zone in admixture with a dilute solution of the working fluid and by supplying the absorption solution to an intermediary point of the rectification zone.

10 Claims, 4 Drawing Figures

COLD AND/OR HEAT PRODUCTION INVOLVING AN ABSORPTION CYCLE AND ITS USE FOR HEATING BUILDINGS

BACKGROUND OF THE INVENTION

This invention pertains to the field of the absorption refrigerating machines.

According to the known basic principles of operation of the prior art absorption refrigerating machines, an absorption heat pump operates by delivering, at an average temperature level $T_2$, a heat amount $Q_2$ greater than a heat amount $Q_1$ supplied thereto at an average temperature level $T_1$ higher than $T_2$, while receiving heat from a heat source at an average temperature level $T_3$, lower than $T_2$, this heat source being, for example, underground water or outside air.

A prior art type system may operate according to the basic embodiment shown in schematic form in FIG. 1. The cycle operates with a working fluid, for example, ammonia as the solute, and a solvent, for example, water.

The working fluid is vaporized by heating the solution contained in the boiler $B0_1$ and supplying of the heat amount $Q_1$ through the exchanger $E_1$. The resulting vapor usually contains some solvent and is rectified by contact with the reflux stream supplied at the top of the rectification zone $R_1$. The vapor discharged from the top of the rectification zone $R_1$ thus consists of a practically pure working fluid. This vapor condenses in the exchanger $E_2$, while heating an external fluid supplied through duct 1 and discharged through duct 2. The resultant condensate is collected in the drum $B_1$. A portion of this condensate is discharged through duct 3 and fed as reflux through pump $P_1$ to the top of the rectification zone $R_1$. The remaining portion is discharged through duct 4, expanded through the expansion valve $V_1$ and fed through duct 5 to the exchanger $E_3$. In the exchanger $E_3$, it vaporized while receiving heat from an external fluid fed through duct 6 and discharged through duct 7. The vapor phase is discharged through duct 8, absorbed in a lean solution which is supplied from the boiler $B0_1$ valve $V_2$ and duct 9 and the lean solution with absorbed vapor phase delivers heat to an external fluid fed through duct 10 and discharged through duct 11. The resultant concentrated solution is collected in the drum $B_2$ and fed through the pump $P_2$ and the duct 12 to the boiler $B0_1$. The concentrated solution fed to the boiler exchanges heat, in the heat exchanger $E_5$, with the lean solution discharged from the boiler.

This arrangement is generally satisfactory when the plant operates by supplying cold and expelling heat in the exchangers $E_2$ and $E_4$ at a relatively low temperature of, for example, 30° to 40° C. When the plant is used for heating, the heating fluid is usually water whose inlet temperature in the exchangers $E_2$ and $E_4$ varies throughout the year. When the heat pump supplies the entire or at least a large part of the heat required for heating, the water outlet temperature may reach values of about 50° C. or more. In that case, when the working fluid is ammonia or a fluid having similar boiling and critical temperatures, the pressures in the generator and in the condenser $E_2$ increase quickly when the outlet temperature of the heated fluid itself increases. For example, in the case of ammonia, the following values of pressure are observed when the temperature increases:

| t (°C.) | 30 | 40 | 50 | 60 | 70 |
|---|---|---|---|---|---|
| p (atm) | 11.89 | 15.85 | 20.73 | 26.66 | 33.77 |

The relatively high pressures attained when the temperature exceeds 50° C. makes the construction of the device more difficult and increases the cost.

A modification of this known process consists of vaporizing only a portion of the working fluid in the vaporizer $E_3$; the entire residual liquid phase is then fed back to the desorption zone (U.S. Pat. No. 2,392,894, No. 4,003,215 and No. 4,037,649; FR Pat. No. 2 412 800; European Pat. No. 1 272). This modification does not cope with the above disadvantage.

DETAILED DISCUSSION OF THE INVENTION

Figure 1:
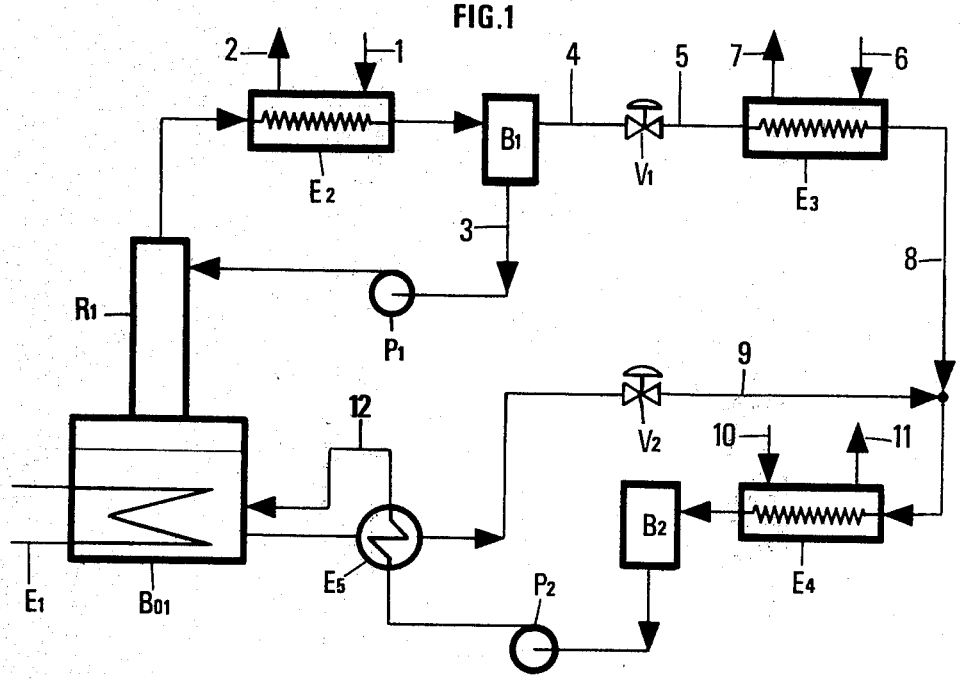
FIG. 1 is a schematic diagram of a prior art adsorption system.
Figure 2:
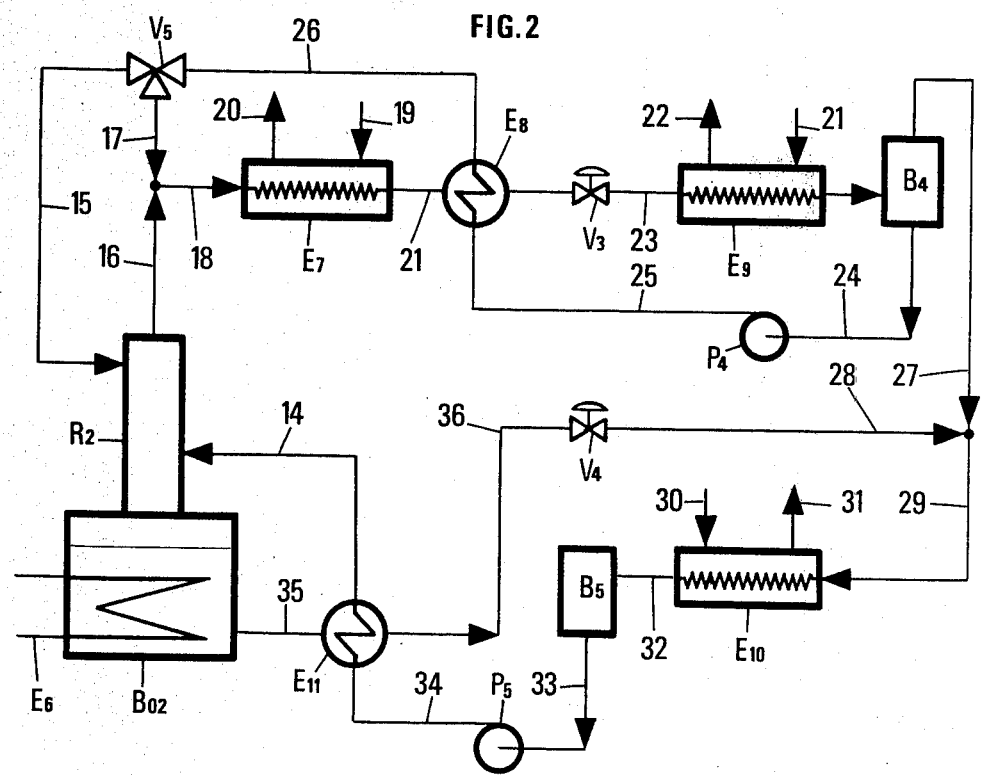
FIG. 2 is a schematic diagram of a first embodiment of the invention.

It has now been found that the pressure level may be limited, and the performance rate increased when operating according to the basic scheme illustrated in FIG. 2.

In the system of FIG. 2 the heat-carrying working fluid (F) is vaporized by heating the solution contained in the boiler $B0_2$, and the necessary heat is supplied through the exchanger $E_6$. The resultant vapor is rectified in the rectification column $R_2$ where it is contacted first with the concentrated solution supplied through duct 14 from the absorption zone, and thereafter with the solution fed to the top of the rectifier column $R_2$ through duct 15. The vapor discharged through the duct 16 is admixed with the solution fed from the duct 17. The resultant liquid-vapor mixture is fed through the duct 18 to the exchanger $E_7$ where the vapor phase condenses at least in part and delivers heat to an fluid external to the system fed through duct 19 and discharged through duct 20. The resultant solution is withdrawn from the exchanger $E_7$ through duct 21, in a saturated or slightly sub-cooled condition. At a given temperature, the larger the water content of the solution, the lower the pressure. Thus, at a temperature of, for example, 60° C., the saturation pressure varies as follows with the ammonia concentration x, expressed in fraction by weight of ammonia:

| x % | 100 | 75 | 61 | 51 |
|---|---|---|---|---|
| p (atm) | 26.7 | 19.4 | 13.6 | 9.7 |

One of the objects of the present invention is to decrease the operating pressure, to thereby reduce the operating costs and to solve the construction problems. In the process of the invention, the operating pressure is decreased by condensing the vapor withdrawn from the rectification zone after having mixed said vapor with a more dilute solution of the working fluid (F). However, obtaining a solution at the outlet from the condenser, instead of a practically pure constituent, poses a number of problems. More precisely, when the solution is expanded through valve $V_3$ and vaporized in the exchanger $E_9$, while recovering heat from an external fluid fed through duct 21 and withdrawn through duct 22, the vaporization temperature does not remain constant, so that a complete vaporization of the solution is only obtained when starting the vaporization at a very low temperature, which results in a very low pressure and a reduction in the performance of the process. In the process according to the invention, the solution supplied to the exchanger $E_9$ through duct 23 vaporizes only partly by heat exchange with the external fluid fed through duct 21 and withdrawn through duct 22. The resultant liquid-vapor mixture is collected in the decantation drum $B_4$. The vapor phase is withdrawn through duct 27. The liquid phase is withdrawn through duct 24 and fed, through pump $P_4$, to duct 25. According to the preferred embodiment of FIG. 2, the withdrawn liquid phase exchanges heat in exchanger $E_8$ with the solution withdrawn from exchanger $E_7$ and is withdrawn from exchanger $E_8$ through duct 26.

In the invention two zones can be defines as follows: a first zone comprises the exchangers $E_7$, $E_8$ and $E_9$ and the entire circuit of lines 18, 21, 23, 24 and 25, the expansion valve $V_3$ and the decantation drum $B_4$; and the second zone comprises the other parts of the device. It is clear that a continuous operation is only attained when the amounts of solvent (S) and heat-carrying fluid (F) withdrawn from the second zone and fed to the first zone are the same as the amounts of solvent and heat-carrying fluid withdrawn from the first zone and fed to the second zone. Since the outlet temperature of the exchanger $E_9$ is generally far lower than the temperature of the vapor withdrawn through duct 16, the solvent content of the vapor discharged through duct 16 is higher than the solvent content of the vapor withdrawn from drum $B_4$. Under these conditions, a continuous operation is only obtained when a phase is transferred from the first zone to the second zone, the solvent content of which is larger than in the vapor discharged from the second zone through duct 16. In the process of the invention, this is achieved by dividing the solution fed from the duct 26 into 2 fractions through the distribution valve $V_5$. A first fraction is fed through duct 17 and admixed with the vapor withdrawn through duct 16. The resultant liquid-vapor mixture is fed through duct 18 into the exchanger $E_7$ as described above. The remaining portion of the solution is fed through duct 15 to the rectification column $R_2$.

Since the remaining portion of the solution is formed at a pressure not substantially different from the pressure in the absorption zone, and its saturation temperature at this pressure is lower than the saturation temprature of the solution withdrawn from the absorption zone, it has a higher solute (F) content than the solution withdrawn from the absorption zone.

For this reason, according to the process of the invention, it is fed to the top of the rectification zone, so that a vapor phase is obtained at the outlet of the rectification zone, whose solute (F) content has been increased and whose solvent (S) content has been decreased, thus decreasing the amount of heat required to be supplied to the boiler. The vapor is withdrawn through duct 16.

The vapor discharged through duct 27 is admixed with the lean solution fed from duct 28, and the resultant liquid-vapor mixture is supplied to the exchanger $E_{10}$ through duct 29. The vapor phase is then absorbed and heat is delivered to an external fluid fed through duct 30 and withdrawn through duct 31. The resultant concentrated solution is withdrawn from the exchanger $E_{10}$ through duct 32 and is collected in the drum $B_5$. It is then withdrawn from the drum $B_5$ through duct 33, and fed, through the pump $P_5$, and duct 34 to the exchanger $E_{11}$. In the exchanger $E_{11}$, the concentrated solution exchanges heat with the lean solution which is withdrawn from the boiler $BO_2$ and fed through duct 35 to be cooled in the exchanger $E_{11}$, and withdrawn therefrom through duct 36. The lean solution from the boiler $B0_2$ is then expanded through the expansion valve $V_4$ and recycled through duct 28 to the absorption zone.

The invention may be defined as:

An improved process for cold and/or heat production, according to an absorption cycle operates with a working fluid (F) as the solute, and a fluid (S) as the solvent, the boiling temperature of fluid (S) being higher than the boiling temperature of fluid. The said cycle comprises at least one absorption step, at least one desorption step, at least one rectification step for the vapor withdrawn from the desorption step, at least one condensation step and at least one vaporization step. More specifically, the process comprising the steps of:

(a)—in the vaporization step, vaporizing a portion of the liquid phase ($L_1$) of high fluid (F) content obtained in the condensation step (d), by taking the necessary vaporization heat at least partly from an external fluid, recovering a vapor phase ($V_1$) and a liquid phase ($L_2$), separating said vapor phase ($V_1$) from said liquid phase ($L_2$) and fractionating said liquid phase ($L_2$) into at least a first fraction and at least a second fraction, (b)—in the absorption step, the vapor phase ($V_1$) from step (a) is contacted with a liquid phase ($L_3$) of low fluid (F) content and high fluid (S) content from the desorption step (c), delivering heat to an external fluid and recovering a solution ($S_1$) of increased fluid (F) content, (c)—feeding at least one portion of the solution ($S_1$) from step (b) to an intermediate point of a rectification zone where there is effected the rectification step, flowing down said portion of the solution ($S_1$) in said rectification zone, supplying heat at the bottom of said rectification zone by means of a heating fluid, so as to effect said desorption step of said solution ($S_1$) and obtain a vapor phase ($V_2$) and desorbed liquid phase ($L_3$), withdrawing said liquid phase ($L_3$) and feeding it to step (b), introducing said first portion of the liquid phase ($L_2$) from step (a) into said rectification zone, at the top thereof, flowing down said first portion in said rectification zone, circulating said vapor phase ($V_2$) upwardly in said rectification zone and withdrawing a vapor phase ($V_3$) from the top of said rectification zone, and (d)—mixing said vapor phase ($V_3$), withdrawn from the top of said rectification zone, with said second portion of the liquid phase ($L_2$) from step (a), cooling the resultant mixture by heat exchange with an external fluid, in the condensation step, so as to form said condensed liquid phase ($L_1$), and feeding said phase ($L_1$) to step (a).

The solution withdrawn from the absorption step may be supplied at a number of points of the rectification zone. It can be introduced, for example, in its entirety at an intermediate point of the rectification zone, with the solution withdrawn from the vaporization step being fed at the top. It is also possible, although less desirable to introduce only one portion (50 to 100%) of the absorption solution at an intermediary point of the rectification zone and to introduce the remainder thereof at another point, for example, at the top, at the bottom, or directly to the desorption step.

The invention also concerns the case where two interconnected distinct columns are used, one corresponding to the higher portion of the single column described above (i.e., the zone located above the intermediate point, as defined above), and the other one to the lower portion thereof.

The origin of the heat supplied in the desorption step may be selected at will. It can be provided, for example, from the combustion of a gaseous or liquid hydrocarbon, such as natural gas or a fuel-oil used for domestic heating, or otherwise industrial fuel-oil in the case of large power plants. Heat of combustion gas may be transmitted directly through a heat exchange surface or by means of a heat-carrying fluid such as, for example, pressurized water or an organic heat-carrying fluid.

The heat of the fluid supplying the heat necessary to the desorption step may be more completely recovered by operating according to the arrangement described in the French patent application No. 79/09836, and consists of dividing the solution withdrawn from the absorption step into two portions, one of which is fed to an intermediate point of the rectification zone, and the other portion is partly vaporized by exchanging heat, preferably in a counter-current mode, with the external heating fluid after having recovered heat therefrom in the boiler. The resultant liquid-vapor mixture obtained by partial vaporization of said other portion is fed to the base of the rectification zone, the vapor phase is mixed with the vapor phase from the boiler, and the liquid phase is collected in the boiler with the liquid phase which has contacted the vapor phase in the rectification zone.

It is also possible, particularly when the amount of the so-recovered heat is relatively low as compared with the amount of heat delivered to the boiler, to supply the entire solution from the absorption step to the rectification zone, after having cooled the external fluid used to heat the desorber (after passage thereof in said desorber) by heat exchange with said solution, optionally causes some initial vaporization of said solution.

If the vaporization is excessive there would result an excessive stripping of the solvent (S), and thus a reduction of the performance of the process, and must therefore be avoided.

The process delivers heat to an external fluid in exchangers $E_7$ and $E_{10}$ and receives heat from an external fluid in exchanger $E_9$. In these heat exchanges, the temperature of the mixture of the fluids (F) and (S) varies, as well as the temperature of the external fluids. It is thus advantageous to effect these heat exchanges counter-currently, the mixture of the fluids (F) and (S) following, in the condensation step and the absorption step, a decreasing temperature evolution parallel to the increasing temperature evolution of the external fluid, and, in the vaporization step, an increasing temperature evolution parallel to the decreasing temperature evolution of the external fluid.

The invention is of particular interest when the fluid (F) is ammonia and the fluid (S) is water. However other fluids may also be used in either pure form, or as mixtures.

The fluid (F) may be, for example, a hydrocarbon whose molecule has from 3 to 5 carbon atoms, such as propane, normal butane, isobutane, normal pentane, isopentane, or a halogenated hydrocarbon of the "Freon" type whose molecule has one or two carbon atoms and at least one fluorine atom, for example, difluorochloromethane (R-22), dichlorofluoromethane (R-21) or difluorodichloromethane (R-12). The solvent may be, for example, dimethylformamide, diethylformamide, ethylene glycol, diethylene glycol, triethylene glycol, tetraethylene glycol dimethyl ether, dibutyl phthalate, dimethylsulfoxide, N-methyl pyrrolidone, N,N-dimethyl acetamide, isobutyl acetate, benzyl alcohol, aniline, or a hydrocarbon selected from the paraffinic hydrocarbons.

The fluid (F) may also be, for example, methylamine, and the fluid (S) water.

As a rule, any mixture of a working fluid (F) with a solvent (S) may be used, provided that these materials are chemically stable in the operating conditions of temperature and pressure, that the working fluid and the solvent can be vaporized, alone or as mixtures, in the operating conditions of temperature and pressure, that the working fluid and the solvent can be vaporized, alone or as mixtures, in the operating conditions of temperature and pressure, and that the volatility of the working fluid is greater than the volatility of the solvent.

The following examples, given by way of illustration, illustrate the specific points of the process.

EXAMPLE 1

Figure 3:
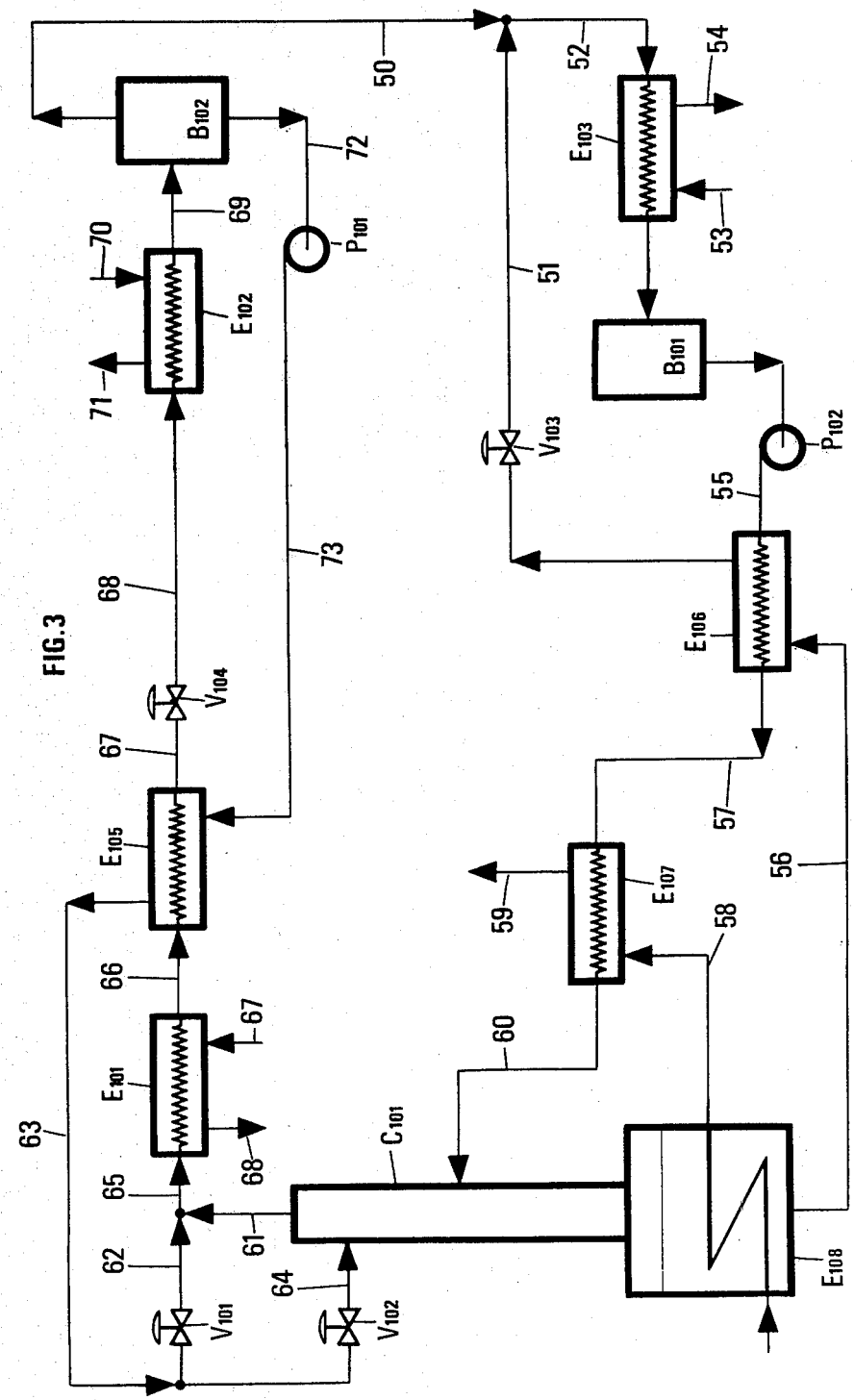
FIG. 3 is a schematic diagram of a second embodiment of the invention.

This example is illustrated by the schematic diagram of FIG. 3.

The absorption step is operated by contacting a solution withdrawn from the desorption step through duct 51 with a vapor phase withdrawn from the evaporation step through duct 50.

The mixture fed through duct 51 has the following composition (in molar fractions):
$NH_3$: 8%
$H_2O$: 92%

The vapor phase fed through duct 50 comprises 99.96% of ammonia. The feed rate of the vapor phase is 72.1 kg/h and the feed rate of the solution is 224.4 kg/h. The liquid-vapor mixture is fed through duct 52 to the exchanger E 103, and the absorption step operates by delivering the absorption heat to water in a heating circuit, which is supplied at 40° C. through duct 53 and withdrawn at 55° C. through duct 54. The resultant solution is collected in the drum B 101 and fed through pump P 102 and duct 55 to the exchanger E 106. In this exchanger, it is heated by heat exchange with the lean solution fed through duct 56. It is then withdrawn from the exchanger E 106 through duct 57 at a temperature of 125° C. It is then supplied to exchanger E 107 where it is heated in counter-current to the combustion gas which cools down in the heat exchange. This combustion gas is fed through duct 58 and discharged through duct 59. The solution is withdrawn from exchanger E 107 through duct 60 and is supplied to the column C 101. The column has 8 trays and the solution is supplied at the 4th tray. The pressure at the top is 15.9 atm.

The column comprises a boiler heated through the heat exchange surface E 108 by the combustion gas from a burner fed with natural gas. Heat is thus delivered to the boiler in an amount of 40,636 Kcal/h. The combustion gas is withdrawn from the boiler through duct 58 at a temperature of 280° C. It is then fed to exchanger E 107 and withdrawn therefrom through duct 59 at 180° C.

The vapor discharged from the top of the rectification column is withdrawn through duct 61; 16.8 kg/h of solution is supplied through duct 62, said solution being obtained by passing through the distribution valve V 101 a portion of the solution fed through duct 63. The remainder of the solution from duct 63 is passed through the distribution valve V 102 and supplied through duct 64 to the top of the column C 101. The liquid-vapor mixture obtained after having mixed the top vapor with the additional amount fed through duct 62 is fed through duct 65 to exchanger E 101, wherefrom it is withdrawn through duct 66. The condensation heat, amounting to 28,934 Kcal/h, is supplied counter-currently to the water of a heating circuit, fed at 40° C. through duct 67 and discharged at 55° C. through duct 68. The resultant solution is fed through duct 66 to exchanger E 105 wherefrom it is withdrawn through duct 67. It is expanded through the expansion valve V 104, fed through duct 68 to exchanger E 102 and withdrawn through duct 69. The vaporization heat is recovered counter-currently from underground water supplied at 12° C. through duct 70 and withdrawn at 4° C. through duct 71. The liquid-vapor mixture withdrawn from exchanger E 102 is collected in drum B 102 where the liquid and the vapor phases are separated.

The liquid phase is withdrawn through duct 72 and fed through pump P 101 and duct 73 to the exchanger E 105 from where it is discharged through duct 63 at 40° C. The vapor phase is recycled through duct 50 to the absorption step.

EXAMPLE 2

Figure 4:
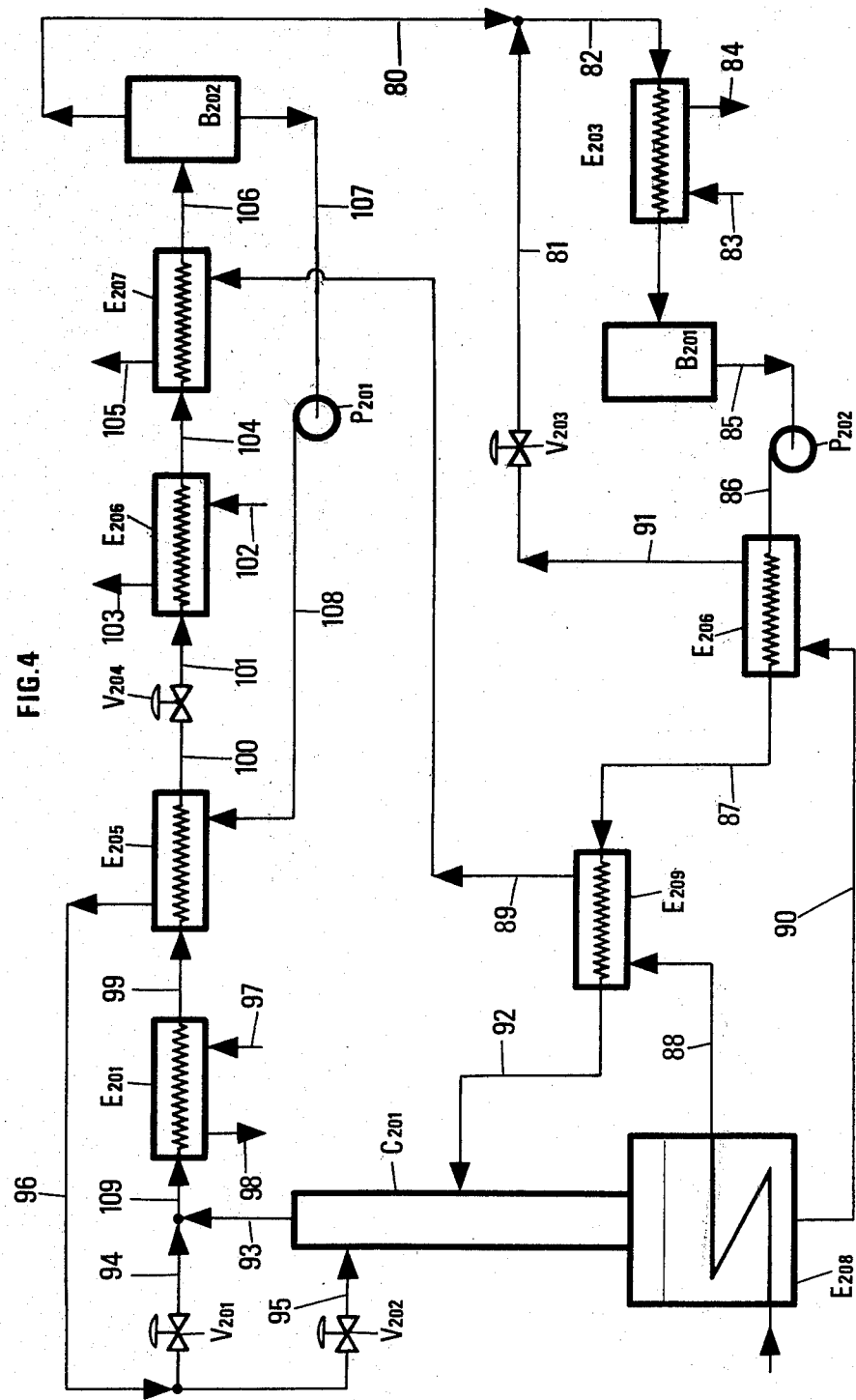
FIG. 4 is a schematic diagram of a third embodiment of the invention.

This example is illustrated by the schematic diagram of FIG. 4. The absorption step is effected by contacting a solution withdrawn through duct 81 from the desorption step with a vapor phase withdrawn through duct 80 from the evaporation step. The water-ammonia mixture of line 81 comprises 5% by mole of ammonia. The resulting liquid-vapor mixture is supplied through duct 82 to exchanger E 203 and the absorption step is effected by releasing absorption heat to the water of a heating circuit, which is fed at 26° C. through duct 83 and withdrawn at 32° C. through duct 84. The resultant solution in an amount of 202.6 kg/h is collected in the drum B 201. It is transferred through duct 85, pump P 202 and duct 86 to the exchanger E 206 where it exchanges heat with the lean solution withdrawn from the boiler; it is withdrawn at 94° C. from exchanger E 206 through duct 87. It is then supplied to exchanger E 209 where it exchanges heat with the combustion gas fed through duct 88 to the boiler and withdrawn through duct 89. It is introduced, in partially vaporized condition, through duct 92, onto the 4th tray of the 8-tray column C 201. The top pressure in the column is 8.6 atm. The column has a boiler heated by the combustion gas from a burner fed with natural gas. 31,991 Kcal/h are thus transferred to the boiler through the exchange surface E 208.

Vapor is withdrawn from the top of the column C 201 through duct 93. It is mixed with 89.6 kg/h of solution supplied from the distribution valve V 201 through duct 94. The other portion of the solution fed from duct 96 is passed through the distribution valve V 202 and supplied to the top of column C 201. The resulting liquid-vapor mixture obtained by mixing the vapor withdrawn from the top of the column C 201 with the additional liquid fed from duct 94 is supplied through duct 109 to exchanger E 201 where it condenses and releases 23,142 Kcal/h to the water of a heating circuit supplied at 26° C. through duct 97 and withdrawn at 32° C. through duct 98. The resultant solution is supplied through duct 89 to exchanger E 205 and withdrawn therefrom through duct 100. It then expands through the expansion valve V 204 and is supplied through duct 101 to exchanger E 206 where it is partially vaporized by heat exchange with outside air supplied at 10° C. through duct 102 and withdrawn at 5° C. through duct 103. The relative humidity of the air exceeds 50%, so that no condensation of water from the outside air occurs and no defrosting is necessary under these operating conditions. The liquid-vapor mixture withdrawn from exchanger E 206 is supplied through duct 104 to exchanger E 207 where the vaporization of the water-ammonia mixture is continued by heat exchange with the combustion gas from exchanger E 209, which is fed through duct 89 and withdrawn through duct 105. The resulting liquid-vapor mixture is withdrawn from exchanger E 207 through duct 106 at a temperature of 15° C.; it is collected in the drum B 202 where the liquid phase and the vapor phase separate. The liquid phase is withdrawn through duct 107 and fed through pump P 201 and duct 108 to the exchanger E 205. The vapor phase is withdrawn through duct 80 and recycled to the absorption step.

EXAMPLE 3

The following comparison examples, based on FIG. 3, show the influence of the location of the feed point for the column C 101 on the performance rate of the system.

The power delivered by the process of the invention in the exchangers E 101 and E 103 amounts to 100 Kw; it is used to reheat water of a heating circuit from 45° to 60° C. The cold source is underground water available at 12° C., and which is discharged at 6° C. after passage through the evaporator E 102. The column C 101 has 7 trays.

(a)—the first case, the duct 60 opens into the duct 64 to introduce the ammonia solution to be purified into the column C 101 above the first tray (the trays are numbered from the top);

(b)—in the second case, the liquid feed charge (line 60) is fed above the third tray of the column, and the reflux (line 64) is fed above the first tray.

The main results of the two embodiments are summarized in the following Table where the performance rate is expressed in relation to the power supplied to the reboiler (E 108) of the column and to the exchanger E 107.

| STAGE No. LIQUID FEED CHARGE | FEED RATE | POWER | | PERFORMANCE RATE |
| --- | --- | --- | --- | --- |
| | | RE-BOILER | EVAPORATOR | |
| 1 | 415 Kg/h | 70.0 Kw | 27.6 Kw | 1.45 |
| 3 | 409 Kg/h | 66.2 | 29.2 Kw | 1.50 |

This example shows that it is advantageous to supply the charge at an intermediary point of the column and the reflux at the top thereof.

These examples are given by way of illustration and other uses of the process are contemplated. For example, the fluid of the heating circuit to which heat is transferred in the condensation and absorption steps may also be air. If the room to be heated is ventilated with air, heat may be transmitted to the outside air which is heated before being fed into the room to be heated. It can also be transferred to the internal air of the room, to re-heat this air which is thereafter re-circulated, or to a mixture of outside air and internal air.

The fluid which circulates in the heating circuit may feed the exchangers through which is transferred the heat delivered by the process in the condensation and absorption steps, either in parallel or in series.

The different steps of the process may be performed with different types of materials.

The rectification column may be built with, for example, cap-trays or valve-trays, or with different types of packing, either as distinct elements of a size smaller than the diameter of the column (for example, Raschig rings, Pall rings, Berl saddles as used in engineering) or as woven elements such as, for example, "Multiknit" packings manufactured by Tissmetal.

The exchangers may be, for example, plate-exchangers such as brazed aluminum exchangers, or otherwise double tube-exchangers.

The mixing of a gas phase with a liquid phase may be effected either in-line or in an enclosure comprising mechanical or static stirring means, the mixing resulting in the latter case from the passage of the phases to be mixed, for example, around an helix or through a packing. The above discussed mixings and the heat supply by at least partial condensation of said mixtures can be performed either successively, the mixing zone being distinct from the exchanger through which heat is delivered to the exterior, or simultaneously by cooling the enclosure where the mixing is effected.

The pressure in the desorption zone is usually between 3 and 25 bars, and the pressure in the absorption zone is usually between 1 and 15 bars.

The temperature of the fluids (F) and (S) in the condensation and absorption steps is usually between 20° and 100° C. and the temperature of the mixture in the vaporization step is usually from −15° to 50° C.

The present process may have other uses than the heating of buildings: the evaporation step, which is used in the heat pumps to recover heat in order to thereafter deliver heat in the condensation and absorption steps, may also be used to produce cold; in that case, heat delivered in the absorption and condensation steps is either used as heating means or rejected to the environment.

What is claimed is:

1. An improved process for cold and/or heat production, in an absorption cycle operating with a working fluid (F) as a solute, and a fluid (S) as the solvent, the boiling temperature of the fluid (S) being higher than the boiling temperature of the fluid (F), and said cycle comprising at least one absorption step, at least one desorption step, at least one rectification step for the vapor withdrawn from the desorption step, at least one condensation step and at least one vaporization step, the improvement comprising the steps of:
   (a) vaporizing, in the vaporization step, a portion of the liquid phase ($L_1$) of high fluid (F) content, obtained in the condensation step (d), taking the necessary vaporization heat at least partly from an external fluid, recovering a vapor phase ($V_1$) and a liquid phase ($L_2$), separating said vapor phase ($V_1$) from said liquid phase ($L_2$), and fractionating said liquid phase ($L_2$) into at least one first fraction and at least one second fraction,
   (b) contacting the vapor phase ($V_1$) from the step (a), in the absorption step, with a liquid phase ($L_3$) of low fluid (F) content and high fluid (S) content from the desorption step (c), delivering heat to an external fluid, and recovering a solution ($S_1$) of increased fluid (F) content,
   (c) feeding at least one portion of the solution ($S_1$) from step (b) to an intermediate point of a rectification zone wherein the rectification step is effected, flowing said portion of the solution ($S_1$) downwardly in said rectification zone, supplying heat at the bottom of said rectification zone by means of a heating fluid, so as to effect said desorption step of said solution ($S_1$) and to obtain a vapor phase ($V_2$) and a desorbed liquid phase ($L_3$), withdrawing said liquid phase ($L_3$) and feeding it to step (b), introducing said first portion of the liquid phase ($L_2$) from step (a) into said rectification zone, at the top thereof, flowing said first portion downwardly in said rectification zone, circulating said vapor zone ($V_2$) upwardly in said rectification zone, and withdrawing a vapor phase ($V_3$) from the top of said rectification zone, and
   (d) mixing said vapor phase ($V_3$), withdrawn from the top of said rectification zone, with said second portion of the liquid phase ($L_2$) from the step (a), cooling the resultant mixture by heat exchange with an external fluid, in the condensation step, so as to form said condensed liquid phase ($L_1$), and feeding said phase ($L_1$) to the step (a).

2. A process according to claim 1, comprising effecting the heat exchange of the condensation, absorption and vaporization steps counter-currently, the mixture of the fluids (F) and (S) following, in the condensation and absorption steps, a decreasing temperature evolution parallel to the increasing temperature evolution of the external fluid and, in the vaporization step, an increasing temperature evolution parallel to the decreasing temperature evolution of the external fluid.

3. A process according to claim 1, comprising passing the heating fluid supplying heat to the desorption step, at the outlet of the desorption step, in heat exchange contact with at least one portion of the solution ($S_1$) from the absorption step, before said solution is introduced into the rectification zone.

4. A process according to claim 1, comprising dividing the solution ($S_1$) from the absorption step into at least two fractions, a first fraction of which is supplied to the said intermediate point of the rectification zone and a second fraction of which is heat exchanged with the heating fluid providing necessary heat to the desorption step, after said heating fluid has delivered said heat to the desorption step, subsequently supplying said second fraction to the desorption step without passing through the rectification zone.

5. A process according to claim 1 comprising heat contacting the expanded liquid phase ($L_1$), in step (a), first with external water and/or air, and then with a combustion gas, said combustion gas resulting from a combustion supplying heat to the desorption step.

6. A process according to claim 5, comprising heat exchanging the combustion gas from the desorption step first with at least a portion of the solution $S_1$ from the absorption step, and then with the expanded liquid phase ($L_1$).

7. A process according to claim 1, wherein the pressure is 1–15 bars in the absorption zone and 3–25 bars in the desorption zone, the pressure being higher in the desorption zone than in the absorption zone.

8. A process according to claim 1, wherein the temperature at the end of the condensation and absorption steps is between 20° and 100° C.

9. A process according to claim 1 wherein the temperature of the vaporization step is between −15° and 50° C.

10. A process according to claim 1, comprising heat exchanging the liquid phase ($L_2$) of step (a) with the condensed liquid phase ($L_1$) of the step (d) before fractionation into at least one first fraction and at least one second fraction.

* * * * *